(12) United States Patent
Hecker et al.

(10) Patent No.: US 11,059,462 B2
(45) Date of Patent: Jul. 13, 2021

(54) METHOD AND DEVICE FOR CONTROLLING A MOVEMENT OF A VEHICLE, AND VEHICLE MOVEMENT CONTROL SYSTEM

(71) Applicant: KNORR-BREMSE SYSTEME FUER NUTZFAHRZEUGE GMBH, Munich (DE)

(72) Inventors: Falk Hecker, Markgroeningen (DE); Jan Mayer, Freiberg am Necker (DE); Oliver Jundt, Hessigheim (DE); Ulrich Guecker, Schwieberdingen (DE); Adnan Mustapha, Maulbronn (DE); Juergen Steinberger, Groebenzell (DE)

(73) Assignee: KNORR-BREMSE SYSTEME FUER NUTZFAHRZEUGE GMBH, Munich (DE)

(*) Notice: Subject to any disclaimer, the term of this patent is extended or adjusted under 35 U.S.C. 154(b) by 164 days.

(21) Appl. No.: 16/332,896

(22) PCT Filed: Sep. 14, 2017

(86) PCT No.: PCT/EP2017/073210
§ 371 (c)(1),
(2) Date: Mar. 13, 2019

(87) PCT Pub. No.: WO2018/050785
PCT Pub. Date: Mar. 22, 2018

(65) Prior Publication Data
US 2019/0256064 A1     Aug. 22, 2019

(30) Foreign Application Priority Data
Sep. 16, 2016   (DE) ................ 10 2016 117 438.6

(51) Int. Cl.
*B60T 8/17* (2006.01)
*B60T 8/1755* (2006.01)
(Continued)

(52) U.S. Cl.
CPC .............. *B60T 8/1708* (2013.01); *B60T 8/17* (2013.01); *B60T 8/1755* (2013.01);
(Continued)

(58) Field of Classification Search
CPC ........ B60T 8/1708; B60T 8/1755; B60T 8/88; B60T 8/17; B60T 8/17554;
(Continued)

(56) References Cited

U.S. PATENT DOCUMENTS 4,107,776 A * 8/1978 Beale .................... B60W 10/06
                                                     477/43
9,507,346 B1 * 11/2016 Levinson ............. G05D 1/0291
(Continued)

FOREIGN PATENT DOCUMENTS

CN       1289002 A       3/2001
CN       104470775 A     3/2015
(Continued)

OTHER PUBLICATIONS

International Search Report dated Nov. 22, 2017, of the corresponding International Application PCT/EP2017/073210 filed Sep. 14, 2017.

*Primary Examiner* — Richard M Camby
(74) *Attorney, Agent, or Firm* — Norton Rose Fulbright US LLP; Gerard Messina

(57) ABSTRACT

A method, device and control system for controlling vehicle movement, including: reading-in the specification data from an interface with a generating apparatus, the vehicle having a vehicle movement control system having the generating apparatus for generating specification data for the vehicle
(Continued)

movement, at least one providing apparatus for providing vehicle property(s) and an actuator element for influencing the vehicle movement, the specification data representing a driving corridor/speed profile for a route section, and the at least one vehicle property from an interface with the at least one providing apparatus; determining vehicle guide data using the specification data and the vehicle property(s), the guide data being for controlling the vehicle movement while complying with the specification data; acquiring at least one manipulated variable for the at least one actuator element using the guide data; and outputting the at least one manipulated variable to an interface with the actuator element.

10 Claims, 6 Drawing Sheets

(51) Int. Cl.
*B60T 8/88* (2006.01)
*B60W 30/095* (2012.01)
*B60W 30/00* (2006.01)

(52) U.S. Cl.
CPC ...... *B60T 8/17554* (2013.01); *B60T 8/17557* (2013.01); *B60T 8/17558* (2013.01); *B60T 8/88* (2013.01); *B60T 8/885* (2013.01); *B60W 30/00* (2013.01); *B60W 30/095* (2013.01); *B60T 2270/402* (2013.01)

(58) Field of Classification Search
CPC .. B60T 8/17557; B60T 8/17558; B60T 8/885; B60T 2270/402; B60W 30/00; B60W 30/095; B60W 60/0015; B60W 60/0011; B60W 2040/1315; B60W 2554/00; B60W 10/20; B60W 10/18; B60W 10/04; B60W 30/02; B60W 30/10; B60W 50/045; B60W 50/0205; B60W 2050/0292; B60W 2050/0031; B60W 40/12

See application file for complete search history.

(56) References Cited

U.S. PATENT DOCUMENTS

| | | | |
|---|---|---|---|
| 10,272,779 B2 * | 4/2019 | Tschanz | G05D 1/0005 |
| 2012/0029782 A1 | 2/2012 | Suda | |
| 2014/0005875 A1 | 1/2014 | Hartmann et al. | |
| 2015/0120144 A1 | 4/2015 | De Bruin et al. | |
| 2016/0368491 A1 | 12/2016 | Hauler et al. | |

FOREIGN PATENT DOCUMENTS

| | | |
|---|---|---|
| CN | 105358396 A | 2/2016 |
| DE | 10155938 A1 | 6/2002 |
| DE | 10355794 A1 | 6/2005 |
| DE | 102005018486 A1 | 11/2006 |
| DE | 102005058628 A1 | 6/2007 |
| DE | 102010025612 A1 | 3/2011 |
| DE | 102012203182 A1 | 9/2012 |
| DE | 102012014408 A1 | 1/2014 |
| DE | 102012211901 A1 | 1/2014 |
| DE | 102013213171 A1 | 1/2015 |
| DE | 102013020733 A1 | 6/2015 |
| DE | 102014107917 A1 | 9/2015 |
| DE | 102014215244 A1 | 2/2016 |
| DE | 102015003124 A1 | 9/2016 |
| EP | 2314490 A1 | 4/2011 |
| RU | 2388057 C2 | 4/2010 |
| WO | 2012117057 A1 | 9/2012 |

* cited by examiner

METHOD AND DEVICE FOR CONTROLLING A MOVEMENT OF A VEHICLE, AND VEHICLE MOVEMENT CONTROL SYSTEM

FIELD OF THE INVENTION

The invention relates to a method for controlling a movement of a vehicle, to a device for controlling a movement of a vehicle and to a vehicle movement control system.

BACKGROUND INFORMATION

In utility vehicles, for example trucks, driver assistance systems can be installed which can assume, in particular, specific limited functions.

SUMMARY OF THE INVENTION

The invention has the object of providing an improved method for controlling a movement of a vehicle, an improved device for controlling a movement of a vehicle and an improved vehicle movement control system.

According to the invention, this object is achieved by a method for controlling a movement of a vehicle, by a device for controlling a movement of a vehicle and by a vehicle movement control system having the features of the main claims. Advantageous refinements and developments of the invention are found in the following dependent claims.

According to embodiments of the present invention, in particular a movement controller for vehicles, in particular utility vehicles, can be made available, which can assume, if appropriate in conjunction with a brake system of the vehicle, coordination and implementation of longitudinal guidance and transverse guidance of the vehicle, in particular for highly automated driving. An interface for highly automated driving can be in this context, for example, a driving corridor in which the vehicle is to drive, and a speed profile or acceleration profile which the vehicle is to implement. The movement controller can calculate, in particular in conjunction with the brake system, for example static and dynamic properties of the vehicle, inter alia a setpoint trajectory for the vehicle, by taking into account information about the vehicle.

According to embodiments of the present invention, in particular comfortable and consumption-efficient implementation of, inter alia, such a setpoint trajectory can advantageously be coordinated and achieved by the movement controller. In extreme vehicle movement dynamics ranges there can be, for example, coupling between the longitudinal dynamics and the transverse dynamics of the vehicle. So that driver assistance systems can penetrate as far as this range, the movement controller can provide a possibility of safely and simply controlling the interaction between the longitudinal dynamics and the transverse dynamics. This movement controller can be implemented in conjunction with a brake system and/or can be accommodated in the brake system. In this way, requirements of highly automated driving can be satisfied in particular in that an adjustment of driver assistance functions can be achieved, in particular in driving situations which are critical in terms of vehicle movement dynamics. An interface of the vehicle controller can be configured, for example, in such a way that a simple and at the same time reliable actuating possibility is offered for driver assistance functions accessing said interface, up to highly automated driving. An interface of the movement controller can serve, in particular, as an abstraction level for a vehicle movement dynamics control system which can combine longitudinal guidance and transverse guidance of the vehicle and can permit higher ranking driver assistance functions to adjust the coupling between the longitudinal dynamics and transverse dynamics in a way which is simple and uncritical in terms of time.

A method for controlling a movement of a vehicle is presented, wherein the vehicle has a vehicle movement control system which has at least one generating apparatus for generating specification data for the movement of the vehicle, at least one providing apparatus for providing at least one vehicle property of the vehicle and at least one actuator element for influencing the movement of the vehicle, wherein the method has at least the following steps:

Reading in the specification data from an interface with the generating apparatus, wherein the specification data represent a driving corridor and additionally or alternatively a speed profile for the vehicle for a route section, and the at least one vehicle property from an interface with the at least one providing apparatus;

Determining guide data for the vehicle using the specification data and the at least one vehicle property, wherein the guide data can be used to control the movement of the vehicle while complying with the specification data;

Acquiring at least one manipulated variable for the at least one actuator element using the guide data; and Outputting the at least one manipulated variable to an interface with the at least one actuator element.

In this context the term control can also be understood to refer to open-loop and closed-loop control. The vehicle can be a motor vehicle, in particular a utility vehicle or some other road vehicle. The vehicle movement control system can have the generating apparatus and at least one further apparatus. The driving corridor can describe a surface on the road within which the vehicle is to be moved. The intention is that the vehicle will not leave this surface, even only partially, at any time. In a simple case, the driving corridor can be defined by a left-hand roadway marking and a right-hand roadway marking. In more complex cases, the driving corridor can be limited further by static and/or dynamic obstacles. The driving corridor can thus be time-dependent.

According to one embodiment, in the determining step a setpoint trajectory and additionally or alternatively a setpoint speed profile can be determined for the vehicle as guide data using the specification data and the at least one vehicle property. Such an embodiment offers the advantage that both transverse guidance and longitudinal guidance of the vehicle can be influenced and/or controlled by the method.

In the acquiring step a steering parameter for a steering actuator and additionally or alternatively an acceleration value for a drive system and additionally or alternatively a brake system of the vehicle can also be acquired as the at least one manipulated variable. The steering parameter can be suitable for performing open-loop or closed-loop control of the movement of a vehicle in the transverse direction in the case of use by the steering actuator. The steering parameter can represent a steering angle, a yaw rate, a transverse acceleration, a derivation of the yaw rate, a steering angle rate or combinations of these variables. Such an embodiment offers the advantage that both a setpoint trajectory and additionally or alternatively a setpoint speed profile for the vehicle can be implemented reliably and safely.

In addition in the reading in step further specification data can be read in from an interface with at least one driver assistance apparatus, one driving data sensor and additionally or alternatively one surroundings sensor of the vehicle. In this context, in the determining step the guide data can be determined using the further specification data. The at least one driving data sensor can be configured to provide driving data relating to a movement of the vehicle. In this context, the driving data sensor can also be part of a brake system of the vehicle. The at least one surroundings sensor can be configured to sense surroundings of the vehicle. Such an embodiment offers the advantage that the movement of the vehicle can be stabilized in accordance with the specification data, in particular even under difficult conditions. By such vehicle stabilization, for example also using ABS and additionally or alternatively ESP, the driving corridor can be complied with even in driving situations which are critical in terms of vehicle movement dynamics.

In addition, the method can also have a step of carrying out checking of the vehicle movement control system and additionally or alternatively of a brake system of the vehicle for a fault. In this context, in the determining step guide data can be determined as a function of a result of the checking carried out in the carrying out step, which guide data can be used to control the movement of the vehicle in order to bring about stopping of the vehicle taking into consideration the surroundings of a vehicle. Such an embodiment offers the advantage that the driving function and/or a safe and controlled movement of the vehicle can continue to be made possible at least for a certain minimum time period. In the case of such a concept which is referred to as "fail operational" or functionally capable in the case of a fault, for example an architecture of the brake system is configured in such a way that when a fault occurs in a component which is involved, said fault can be detected and there can be a corresponding reaction thereto. In this context, at least parts of the "fail operational" safety concept can be implemented for the brake system and steering system.

According to one embodiment, the method can also have a step of detecting movement status data of the vehicle using a sensor signal of at least one vehicle sensor. In this context, the movement status data represent vehicle-specific values and limiting values during the movement. In addition, the method can have here a step of transmitting the detected movement status data to an interface with at least one apparatus of the vehicle movement control system. Such an embodiment offers the advantage that feedback of current status data of the movement of the vehicle can be provided to an apparatus of the vehicle movement control system, and therefore precise and situationally correct specification data can be provided and read in for the method.

In the reading in step at least one steering parameter specification can also be read in as the specification data from an interface with at least one driver assistance apparatus of the vehicle. In addition, in the determining step the guide data can be determined using the at least one steering parameter specification. In addition, in the acquiring step a combined steering parameter can be acquired as the at least one manipulated variable using the guide data. Such an embodiment offers the advantage that, as by a coordinator, steering parameter specifications of driver assistance functions which are involved can be combined on the basic of a logic.

In particular, in the reading in step at least one static property of the vehicle and additionally or alternatively at least one dynamic property of the vehicle can be read in as the at least one vehicle property. In this case, at least one vehicle property can represent a sensor information item of at least one vehicle sensor, a dimension of the vehicle, a tractrix of the vehicle in the case of a multi-part embodiment with a towing vehicle and a semitrailer or trailer, a position of a saddle point between the towing vehicle and the semitrailer or trailer, a dimension of a trailer or semitrailer of the vehicle, an axle configuration, a wheelbase, a permissible transverse acceleration, a position of the center of gravity, a tilting limit and additionally or alternatively a steering property. Such an embodiment offers the advantage that the movement of the vehicle can be reliably and precisely controlled while complying with the specification data.

The approach presented here also presents a device which is configured to carry out, actuate and/or implement the steps of a variant of a method presented here, in corresponding apparatuses. This embodiment variant of the invention in the form of a device can also quickly and efficiently achieve the object on which the invention is based.

For this purpose, the device can have at least one computing unit for processing signals or data, at least one memory unit for storing signals or data, at least one interface with a sensor or an actuator for reading in sensor signals from the sensor or for outputting data signals or control signals to the actuator and/or at least one communication interface for reading in or outputting data which are embedded in a communication protocol. The computing unit can be, for example a signal processor, a microcontroller or the like, wherein the memory unit can be a Flash memory, an EEPROM or a magnetic memory unit. The communication interface can be configured to read in or output data in a wireless and/or line-bound manner, wherein a communication interface can read in or output the line-bound data, read in this data, for example, electrically or optically from a corresponding data transmission line or can output said data into a corresponding data transmission line.

A device can be understood here to be a piece of electrical equipment which processes sensor signals and outputs control signals and/or data signals as a function thereof. The device can have an interface which can be embodied by hardware and/or software. In the case of a hardware configuration, the interfaces can be, for example, part of what is referred to as a system ASIC, which includes a wide variety of functions of the device. However, it is also possible for the interfaces to be separate integrated circuits or to be composed of at least partially discrete components. In the case of a software configuration, the interfaces can be software modules which are present, for example, on a microcontroller together with other software modules.

A vehicle movement control system is also presented for a vehicle, wherein the vehicle has at least one providing apparatus for providing at least one vehicle property of the vehicle and at least one actuator element for influencing the movement of the vehicle, wherein the vehicle movement control system has at least the following features:

a generating apparatus for generating specification data for the movement of the vehicle, and an embodiment of the device specified above, wherein the device is connected at least to the generating apparatus in such a way that it is capable of transmitting signals.

In conjunction with the vehicle movement control system, an embodiment of the device specified above can thus advantageously be employed or used to control the movement of the vehicle. The vehicle movement control system can have at least one further apparatus. The at least one further apparatus can be connected to the generating apparatus and additionally or alternatively to the device in such a way that it is capable of transmitting signals.

Exemplary embodiments of the approach presented here are illustrated in the drawings and explained in more detail in the following description.

DETAILED DESCRIPTION

Figure 1:
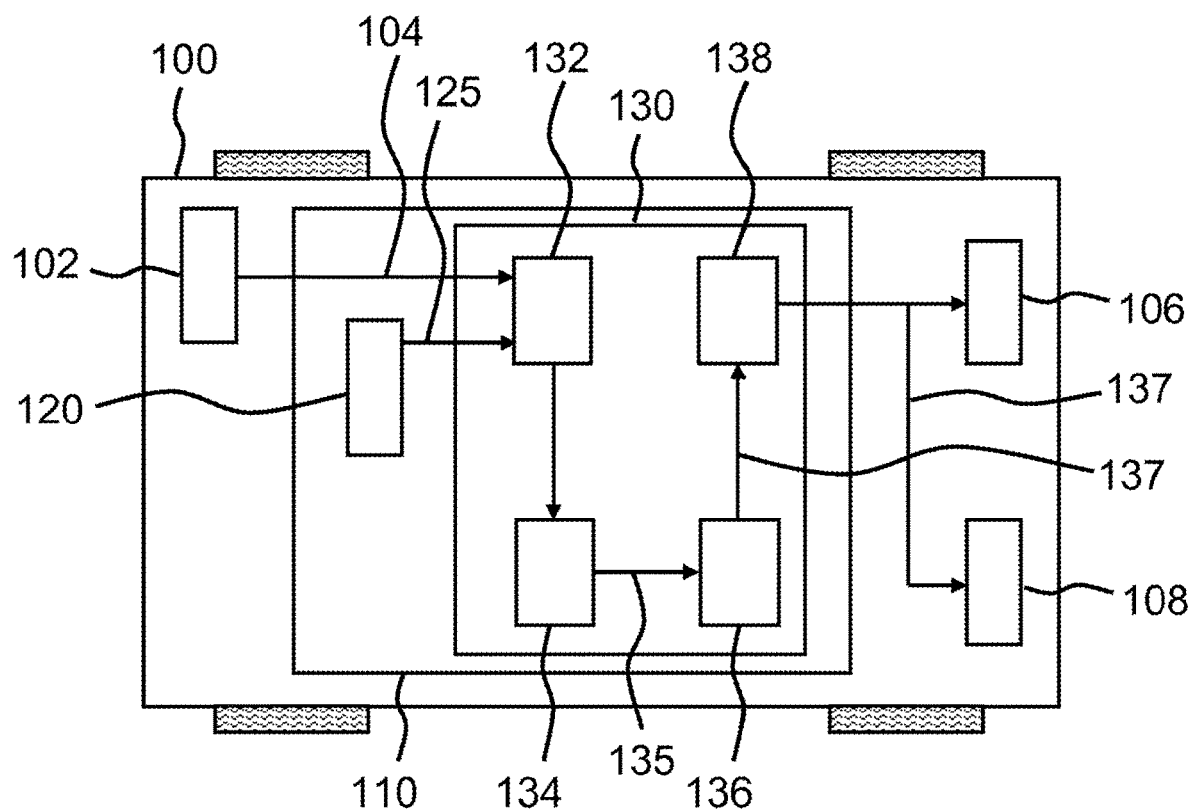
FIG. 1 shows a schematic illustration of a vehicle with a vehicle movement control system according to an exemplary embodiment.

Before exemplary embodiments of the present invention are described below, firstly the background aspects of the present invention are to be briefly explained.

An assistance system for distance-adjusted follow-on travel for vehicles (ACC=Adaptive Cruise Control) assists a driver only in performing longitudinal guidance, and a lane-keeping assistant (LKS=Lane Keeping Support) assists the driver only in performing the transverse guidance of the vehicle. In contrast, an emergency braking assistant (AEBS=Advanced Emergency Brake System; emergency brake) warns about the risk of an imminent collision in the case of tail-end accidents and intervenes through a braking intervention in order to avoid the collision, if a driver reaction fails to occur. However, the transverse guidance of the vehicle is not performed by the AEBS.

For example, ACC is usually configured as a comfort system in such a way that it can request a deceleration only up to, for example, 3 m/s$^2$. If a driving situation requires a higher deceleration, e.g. if a vehicle traveling ahead suddenly brakes very hard, the ACC transmits a take over request to the driver so that he takes over the control again and requests harder braking by brake pedal. If the driver does not do this and if there is a risk of a tail-end accident, the AEBS function starts, for example, an engagement cascade, composed of an acoustic warning, partial braking and full braking, and averts the collision or at least attenuates its consequences. The ACC could react earlier in the situation and would be able to prevent a critical collision situation coming about at all only if the ACC were allowed to request more than e.g. 3 m/s$^2$ deceleration. The requesting of a higher deceleration can, however, be critical for safety depending on the road covering and the weather. Although ABS and ESP ensure steerability and stabilization of the vehicle, the driver should steer the vehicle himself in such a context in order to keep the vehicle in the lane and/or on its avoidance course.

For example, in order to set a longitudinal movement, the ACC and AEBS individually actuate, via standardized interfaces, the engine, transmission and brake system, which, for example, locally take over the task of coordinating requests and/or arbitrating on the basis of a priority-controlled logic. The LKS (lane-keeping support) specifies a setpoint angle for the steering wheel to a steering actuator via a dedicated interface. The scopes and working ranges of many known assistance functions are selected, in particular, in such a way that they are delineated from one another and that a small amount of coupling between the longitudinal dynamics and transverse dynamics arises during their action. An adjustment of such driver assistance systems to one another and their protection can be simplified according to exemplary embodiments of the present invention.

In the following description of favorable exemplary embodiments of the present invention, identical or similar reference symbols are used for the similarly acting elements which are illustrated in the various figures, wherein a repeated description of these elements is dispensed with.

FIG. 1 shows a schematic illustration of a vehicle 100 with a vehicle movement control system 110 according to an exemplary embodiment. The vehicle 100 is here a utility vehicle, in particular a truck, if appropriate with a trailer or semitrailer. The vehicle movement control system 110 is configured to plan, coordinate and control a movement of the vehicle 100.

According to the exemplary embodiment shown in FIG. 1, of the vehicle 100 a providing apparatus 102 for providing at least one vehicle property 104 of the vehicle 100 in signal form is illustrated only by way of example, and a first actuator element 106 and a second actuator element 108 for influencing the movement of the vehicle 100 and the vehicle movement control system 110 are illustrated only by way of example.

The providing apparatus 102 has at least one memory apparatus and/or at least one sensor apparatus of the vehicle 100. The at least one vehicle property 104 represents a sensor information item of at least one vehicle sensor, a dimension of the vehicle, a tractrix of the vehicle in the case of a multi-part embodiment with the towing vehicle and the semitrailer or trailer, a position of a saddle point between the towing vehicle and the semitrailer or trailer, a dimension of a semitrailer or trailer of the vehicle, an axle configuration, a wheelbase, a permissible transverse acceleration, a position of the center of gravity, a tilting limit and/or a steering property.

The first actuator element 106 is, for example, a steering actuator, steering angle actuator or the like. The second actuator element 108 is a brake device and/or a drive train, for example including an engine and transmission.

According to the exemplary embodiment illustrated in FIG. 1, of the vehicle movement control system 110 a generating apparatus 120 for generating specification data 125 for the movement of the vehicle 100 and a control device 130 or device 130 for controlling the movement of the vehicle 100 are shown. The generating apparatus 120 and the control device 130 are connected to one another in such a way that they are capable of transmitting signals.

The generating apparatus 120 is configured to output the specification data 125 to the control device 130 and/or to make said specification data 125 ready for outputting to the control device 130. The specification data 125 represent here a driving corridor and/or a speed profile for the vehicle 100, in particular for a route section which is to be traveled on. The specification data 125 are generated by the generating apparatus 120 and, if appropriate, further apparatuses of the vehicle movement control system 110.

According to the exemplary embodiment shown in FIG. 1, the control device 130 has a reading in apparatus 132, a determining apparatus 134, an acquiring apparatus 136 and an outputting apparatus 138. In this context, the reading in apparatus 132 is configured to read in the specification data 125 from an interface with the generating apparatus 120. In addition, the reading in apparatus 132 is configured to read in the at least one vehicle property 102. In addition, the reading in apparatus 132 is configured to pass read in the at least one vehicle property 104 from an interface with the at least one providing apparatus 102. In addition, the reading in apparatus 132 is configured to on the specification data 125 and the at least one vehicle property 104 to the determining apparatus 134.

The determining apparatus 134 is configured then to determine guide data 135 for the vehicle 100 using the specification data 125 and the at least one vehicle property 104. The guide data 135 can be used to control the movement of the vehicle 100 while complying with the specification data 125. The guide data 135 represent, in particular, a setpoint trajectory and/or a setpoint speed profile for the vehicle 100. The determining apparatus 134 is also configured to pass on the determined guide data 135 to the acquiring apparatus 136.

The acquiring apparatus 136 is configured to acquire at least one manipulated variable 137 for the actuator elements 106 and 108 using the guide data 135 from the determining apparatus 134. The at least one manipulated variable represents, for example, a steering parameter for a steering actuator and/or an acceleration value for a drive system and/or a brake system of the vehicle 100. The steering parameter represents, in particular, a steering angle or alternatively a yaw rate, a transverse acceleration, a derivation of the yaw rate, a steering angle rate or combinations of these variables. The acquiring apparatus is also configured to pass on the at least one manipulated variable 137 to the outputting apparatus 138. The outputting apparatus 138 is configured to output the at least one acquired manipulated variable 137 to an interface with the actuator elements 106 and 108.

According to one exemplary embodiment, the vehicle movement control system 110 and/or the control device 130 can be embodied at least partially as part of a brake system of the vehicle 100.

Figure 2:
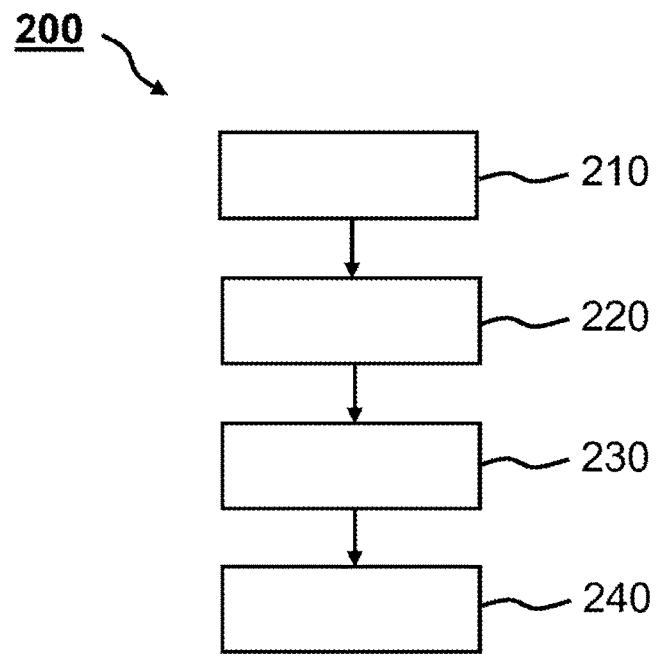
FIG. 2 shows a flowchart of a control method according to an exemplary embodiment.

FIG. 2 shows a flowchart of a control method 200 according to an exemplary embodiment. The control method 200 can be executed in order to control a movement of a vehicle. In this context, the control method 200 can be executed in order to control a movement of the vehicle from FIG. 1 or of a similar vehicle. The control method 200 can be executed in conjunction with and/or using the vehicle movement control system and the control device from FIG. 1 or a similar system or a similar device.

The control method 200 has a step 210 of reading in the specification data from an interface with the generating apparatus and the at least one vehicle property from an interface with the at least one providing device. The specification data represent a driving corridor and/or a speed profile for the vehicle for a route section.

In a determining step 220 in the control method 200, guide data for the vehicle are subsequently then determined using the specification data and the at least one vehicle property which has been read in the reading in step 210. The guide data can be used to control the movement of the vehicle while complying with the specification data.

In an acquiring step 230 in the control method 200, at least one manipulated variable for the at least one actuator element is subsequently determined using the guide data determined in the determining step 220.

In an outputting step 240 in the control method 200, the at least one manipulated variable is then output to an interface with the at least one actuator element.

According to one exemplary embodiment, in the reading in step 210 at least one static property of the vehicle and/or at least one dynamic property of the vehicle are/is read in as the at least one vehicle property. According to an exemplary embodiment, in the determining step 220 a setpoint trajectory and/or a setpoint speed profile for the vehicle are/is also determined as guide data using the specification data and the at least one vehicle property. In addition, according to one exemplary embodiment, in the acquiring step 230 a steering parameter for a steering actuator and/or an acceleration value for a drive system and/or a brake system of the vehicle are/is acquired as the at least one manipulated variable.

According to a further exemplary embodiment, in the reading in step 210 further specification data are read in from an interface with at least one driver assistance apparatus, one driving data sensor and/or one surroundings sensor of the vehicle. Here, in the determining step 210 the guide data are determined using the further specification data.

Additionally or alternatively, in the reading in step 210 at least one steering parameter specification can be read in as the specification data from an interface with at least one driver assistance apparatus of the vehicle. In the determining step 220, the guide data can be determined using the at least one steering parameter specification. In the acquiring step 230, a combined steering parameter can then be acquired as the at least one manipulated variable using the guide data.

Figure 3:
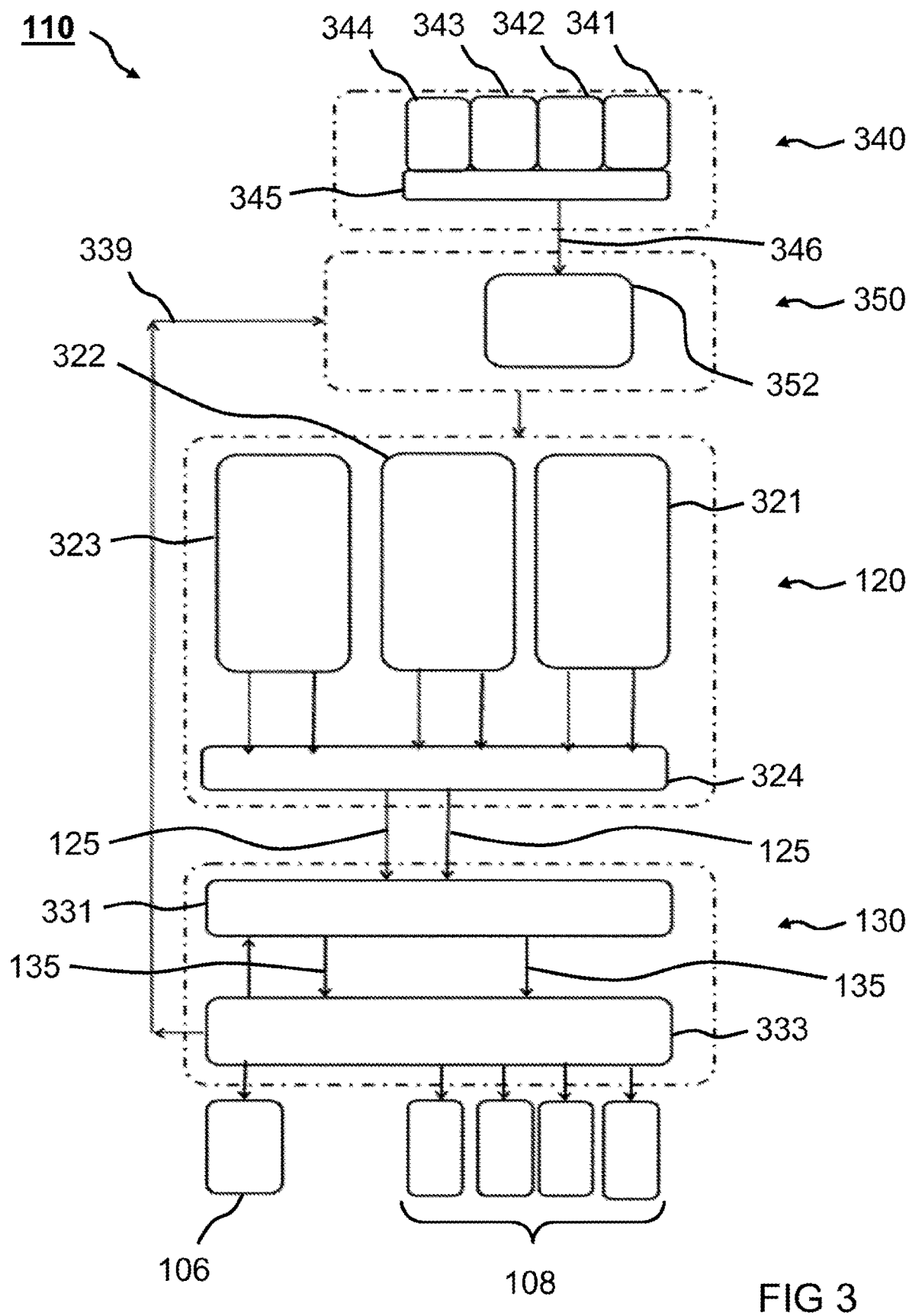
FIG. 3 shows a schematic illustration of a vehicle movement control system according to an exemplary embodiment.

FIG. 3 shows a schematic illustration of a vehicle movement control system 110 according to an exemplary embodiment. Here, the vehicle movement control system 110 corresponds to or is similar to the vehicle movement control system from FIG. 1. The vehicle movement control system 110 is configured to implement functions for highly automated driving (HAD=highly automated driving). Therefore, the vehicle movement control system 110 can also be referred to as an HAD architecture. In other words, FIG. 3 also shows, in particular, an embedding of the control device 130 and/or of what is referred to as a motion controller 130 in the vehicle movement control system 110 and/or in the HAD architecture.

In other words, the outline of the vehicle movement control system 110 in FIG. 3 represents a functional architecture for highly automated driving. According to the exemplary embodiment illustrated in FIG. 3, the vehicle movement control system 110 has four parts or modules which can correspond, for example, to four superordinate processing steps.

These four parts of the vehicle movement control system 110 according to the exemplary embodiment illustrated in FIG. 3, which are merely by way of example, are the generating apparatus 120, or what is referred to as a motion planner 120, the control device 130 or what is referred to as a motion controller 130, a fusion and localization apparatus 340 (Fusion&Localization) and a behavior planning apparatus 350 or what is referred to as a behavior planner 350.

The fusion and localization apparatus 340 is configured to collect available information of sensors 341 and further sources, such as, for example, a communication apparatus 342, an apparatus 343 for road maps and an apparatus 344 for vehicle position coordinates or GPS coordinates, by a carrying out apparatus 345 for carrying out the fusion and localization in a central world model 346, a type of database, and then to make said information available in a conditioned form to the subsequent processing steps.

The information sources which are used can be, inter alia, those specified below: surroundings sensors 341 which are mounted on the vehicle and are based on radar, camera, lidar, ultrasound sensors or the like; driver specifications such as position of the accelerator pedal and brake pedal, steering degree angle and steering torque; estimated or calculated variables such as e.g. vehicle movement status, vehicle mass, axle loads, anticipated braking distance, transverse acceleration limits, space requirement for an avoidance maneuver, wherein information of sensors 341 which are installed in the vehicle and are read in and monitored, for example, by the brake system of the vehicle, such as, for example, rotational speed sensor, rpm and acceleration sensors are used for these calculations; vehicle-to-vehicle or vehicle-to-infrastructure communication (V2V, V2I, V2X); high-precision road maps and GPS coordinates. Such information is further conditioned for the world model 346. The world model 346 therefore supplies, for example, a profile of a separate lane and of adjacent lanes, a current position and orientation of the vehicle in question in the vehicle's own lane and an available space on the road in which the vehicle in question can move. For this purpose, current positions of stationary and dynamic obstacles can be included. The positions of the dynamic obstacles, such as vehicles in the lane in question and in adjacent lanes, can also be predicted for a certain time horizon.

The behavior planner 350 is configured to define a current driving strategy. On the basis of the information of the world model 346, for example, the course of the roadway and free regions, route planning, for example by a navigation system, and characteristic values of current vehicle dynamics, it is decided by a decision apparatus 352 whether, for example, the vehicle in question remains in the lane, changes into an adjacent lane or is to carry out an emergency maneuver or what is referred to as a minimal risk maneuver. In this context, reference is also made to the following figures.

The control device 130 is configured here to supply movement status data 339 and/or characteristic values 339 of current vehicle dynamics to the behavior planner 350. The characteristic values 339 define the ranges for comfortable driving and vehicle-depending and situation-specific limits of the physics of driving. For this purpose, according to the exemplary embodiment illustrated here, the control device 130 is configured to execute a step of detecting movement status data 339 of the vehicle using a sensor signal of at least one vehicle sensor, and a step of transmitting the detected movement status data 339 to an interface with the behavior planner 350 of the vehicle movement control system 110.

The decision in the behavior planner 350 is carried out on the basis of a risk assessment. For this purpose, a value is calculated, and a driving function which is transferred to the generating apparatus 120 and/or the motion planner 120, is selected on the basis of a decision logic, e.g. on the basis of a cost function for possible action options such as, for example, remain in the lane, change lane, emergency maneuver and minimal risk maneuver. Moreover, the driving function is parameterized from the characteristic values of the current vehicle dynamics, in order to permit a driving style which is comfortable, energy-efficient and stable and safe in terms of vehicle movement dynamics.

By way of example typical driving functions for highly automated driving on freeways are explained below. In this context, a differentiation is made in terms of guidance of the vehicle in the longitudinal direction and in the transverse direction, which directions are to be adjusted to one another as in the case of a lane change maneuver, an avoidance maneuver and the minimum risk maneuver, this is because e.g. cutting into flowing traffic can be critical in terms of time. A driving situation is differentiated into comfort driving and into emergency situations, wherein a transition can be fluid. Driver assistance functions such as Cruise Control (CC), distance-adjusted follow-on driving or Adaptive Cruise Control (ACC) and emergency brake system or Advanced Emergency Brake System (AEBS) are assumed but expanded in their working range. For example, the ACC function, which currently in series production decelerates, for example, only up to 3 m/s$^2$, is expanded to a maximum possible longitudinal deceleration. This is possible since the control device 130 is configured to implement this. The HAD system should be continuously monitored. When faults are detected, the driver is to be immediately informed, and when the takeover by him does not occur a minimal risk maneuver is to be initiated which is intended to bring the vehicle to a standstill without a collision.

The generating apparatus 120 or the motion planner 120 is configured to acquire and make available for the driving function requested by the behavior planner 350, a specific driving corridor with an acceleration request for the vehicle, using further information from the world model 346 about the surroundings, such as, for example, the course of the roadway and free regions, as specification data 125. The control device 130 is configured then to guide the vehicle within this driving corridor and at the same time implement the requested acceleration.

For this purpose, the motion planner 120 has a first control apparatus 321 for performing longitudinal and transverse control in a lane, for example in conjunction with the functions of the distance-adjusted follow-on driving, emergency brake system, traffic jam assistant and line of traffic assistant, a second control apparatus 322 for controlling lane changes in conjunction with longitudinal guidance and transverse guidance of the vehicle, and a third control apparatus 323 for a minimal risk maneuver. Each of the control apparatuses 321, 322 and 323 is configured to make available a driving corridor and an acceleration profile and/or an acceleration request $a_{x,dem}$. The driving corridor comprises a left-hand boundary and a right-hand boundary which are described as location functions $y_{l,dem}(x, t_k)$ and $y_{r,dem}(x, t_k)$ at a given time $t_k$ by e.g. cubic splines or by polynomials. An arbitration apparatus 324 is configured to generate the specification data 125 by arbitrating from the driving corridor and the acceleration request of the control apparatuses 321, 322 and 323, and to output said specification data 125 to the control device 130.

The control device 130 is configured to determine guide data 135 for the specification data 125 and/or, inter alia, for the given driving corridor on the basis of the specific driving property, in particular a setpoint trajectory along which the control device 130 then guides the vehicle and, if necessary, also intervenes in a stabilizing manner in the wheel dynamics and vehicle dynamics, for example by an anti-lock brake system and electronic stability package (ABS/ESP). In this context, the control device 130 is divided, merely by way of example, into two parts for the sake of illustration in FIG. 3: in a first component-device 331 the setpoint trajectories are generated and their tracking is implemented. In a second component-device 333 the stabilization of the vehicle takes place.

From the driving corridor, the control device 130 acquires a driving tube in the first component-device 331, which driving tube represents the envelope of the tractrices of all the points on the vehicle. In the second component-device 333 of the control device 130 the vehicle is guided, and if necessary stabilized, within this driving tube.

In addition, in FIG. 3, actuator elements 106 and 108 are shown which are connected to the control device 130, to be more precise to the second component-device 333, in such a way that they are capable of transmitting signals. The first actuator element 106 is, for example, a steering actuator, wherein examples of the second actuator element 108 have a motor, a transmission, deceleration apparatuses, a trailer and other apparatuses.

Figure 4:
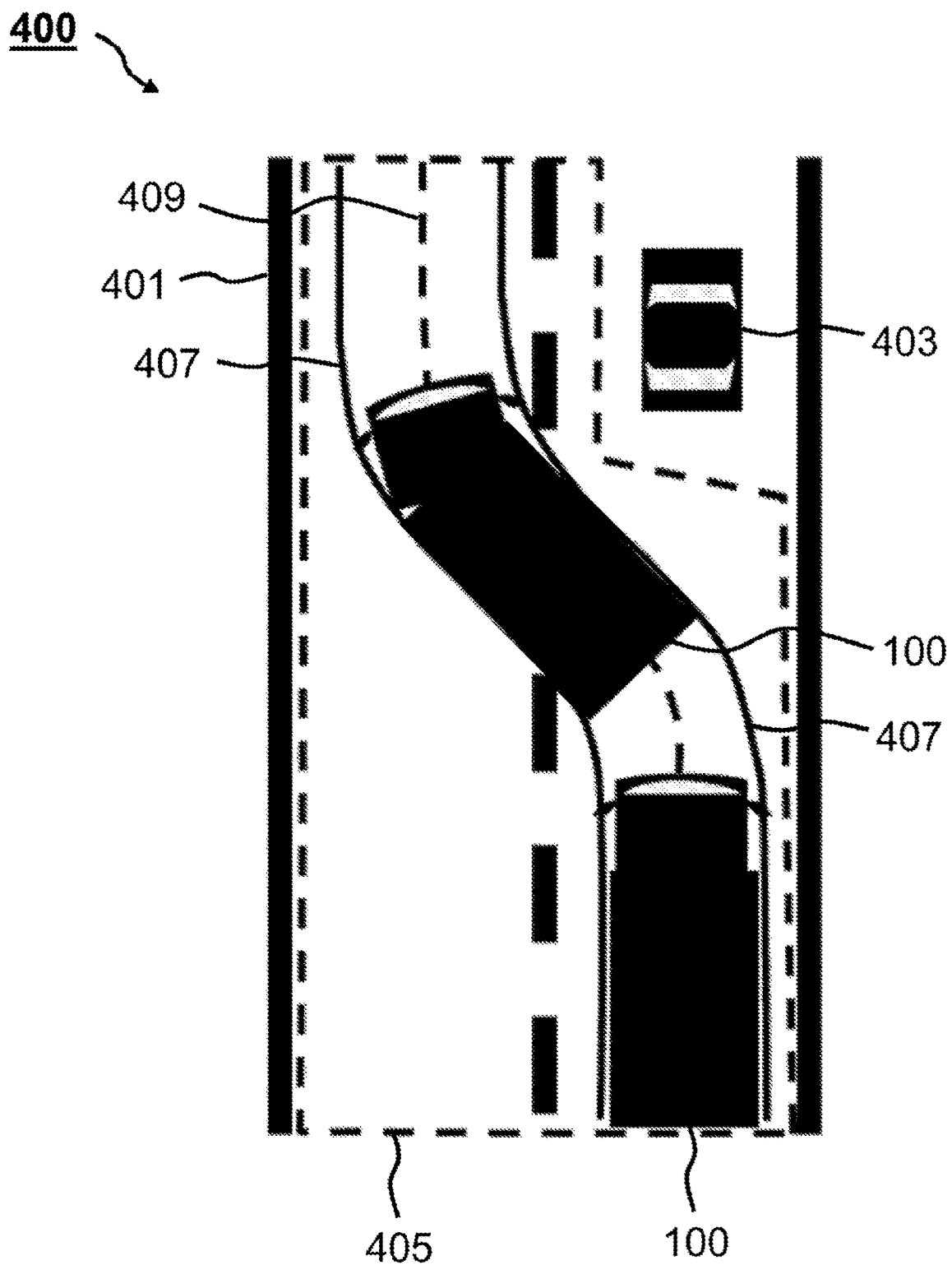
FIG. 4 shows a schematic illustration of a traffic situation according to an exemplary embodiment.

FIG. 4 shows a schematic illustration of a traffic situation 400 according to an exemplary embodiment. In the traffic situation 400, for example two vehicles 100 move on a road 401 or roadway 401. Each of the vehicles 100 corresponds to or is similar to the vehicle from FIG. 1 and correspondingly has the vehicle movement control system from FIG. 1 or FIG. 3 or a similar one. In this context, the vehicles 100 are, for example, utility vehicles with a towing machine and semitrailer.

In addition, another vehicle 403, which represents an obstacle for the vehicles 100, is involved in the traffic situation 400. The vehicles 100, which are traveling, for example, in a line behind one another, are executing an avoidance maneuver with a lane change with respect to the other vehicle 403. An available driving space 405 for the vehicles 100 is indicated on the road 401. In addition, a driving corridor 407 with a left-hand and a right-hand boundary is illustrated The driving corridor 407 represents specification data for the vehicles 100. In the illustrated traffic situation 400 the driving corridor 407 describes a curve for driving around the other vehicle 403. In addition, a trajectory 409 or a path 409 for the vehicles 100 is indicated as guide data within the driving corridor 407.

The driving corridor 407 is configured to permit the control device 130 to determine a suitable trajectory 409 in the driving corridor 407. The driving corridor 407 can be determined here in such a way that at least one trajectory 409 can be arranged in the driving corridor 407. According to one exemplary embodiment, the driving corridor 407 can extend as far as the available driving space 405.

Figure 5:
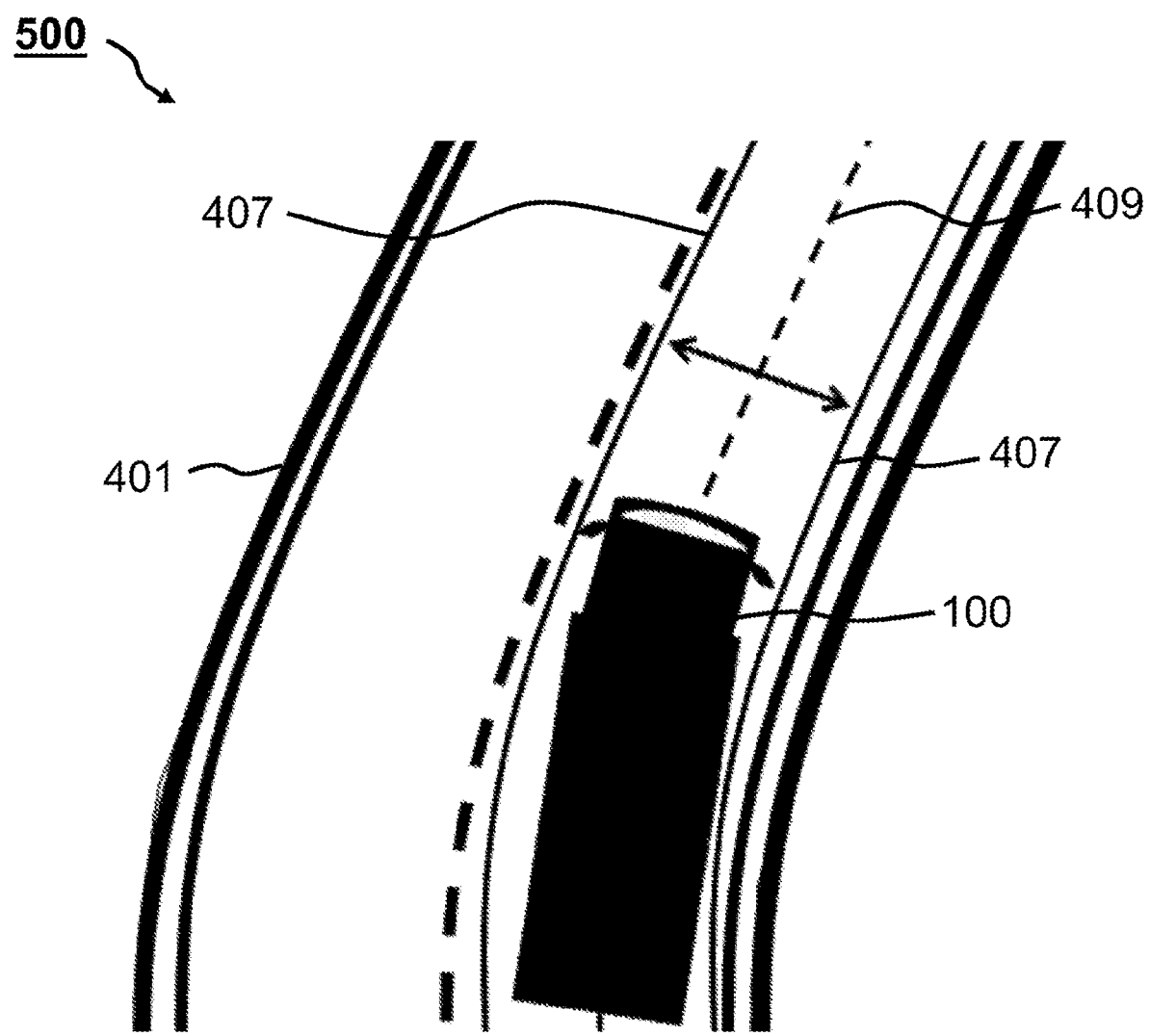
FIG. 5 shows a schematic illustration of a traffic situation according to an exemplary embodiment.

FIG. 5 shows a schematic illustration of a traffic situation 500 according to an exemplary embodiment. The traffic situation 500 in FIG. 5 corresponds here to the traffic situation from FIG. 4 with the exception that in the traffic situation 500 only one vehicle 100 is shown on the road 401, wherein the vehicle 100 moves around a curve in the driving corridor 407 with the trajectory 409.

Figure 6:
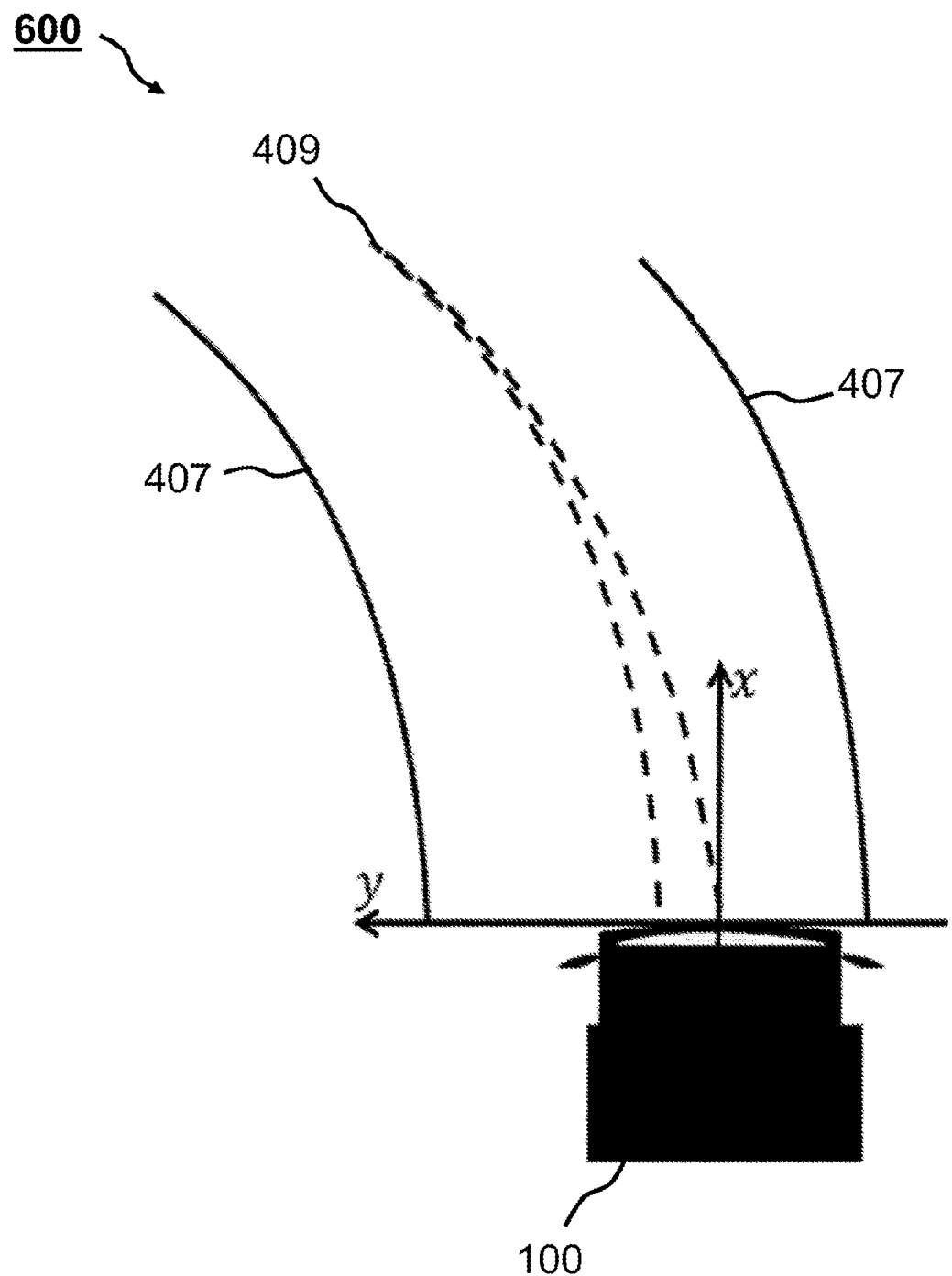
FIG. 6 shows a schematic illustration of a traffic situation according to an exemplary embodiment.

FIG. 6 shows a schematic illustration of a traffic situation 600 according to an exemplary embodiment. The traffic situation 600 in FIG. 6 corresponds here to the traffic situation from FIG. 5 with the exception that in the traffic situation 600 only the vehicle 100 and the driving corridor 407 with the trajectory 409 or reference trajectory 409 are shown. For the sake of illustration, in addition the origin of a coordinate system of an abscissa axis x and ordinate axis y is shown centrally on a front of the vehicle 101.

The driving corridor 407 has a left-hand boundary and a right-hand boundary which can be described as location functions $y_{l,dem}(x, t_k)$ and $y_{r,dem}(x, t_k)$ at a given time $t_k$ or for a current sampled value $t_k$ by e.g. cubic splines or generally by polynomials $y(x)=a_0+a_1x+a_2x^2+a_3x^3$. The reference trajectory 409 can be described by $y_{F,dem}(x, t_k)$.

Figure 7:
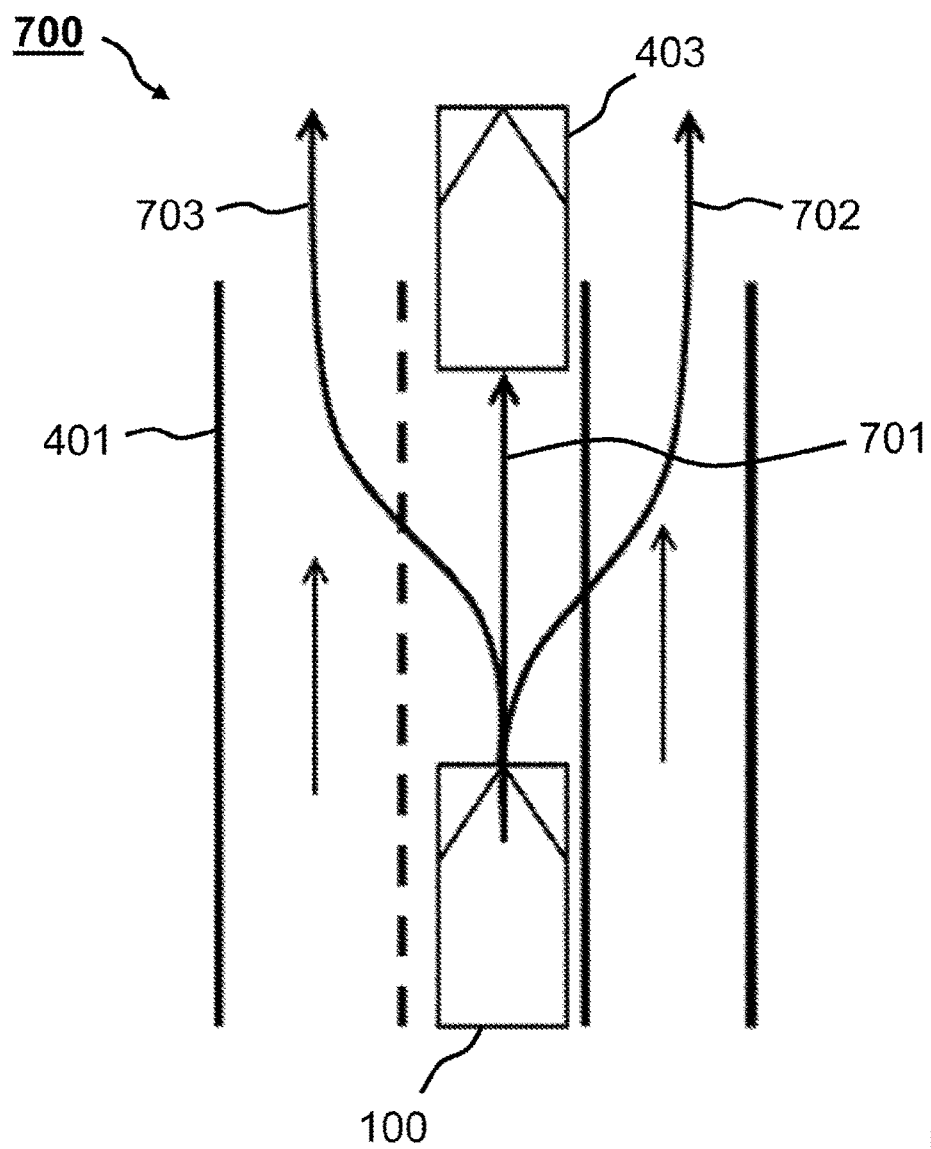
FIG. 7 shows a schematic illustration of a traffic situation according to an exemplary embodiment.

FIG. 7 shows a schematic illustration of a traffic situation 700 according to an exemplary embodiment. In the traffic situation 700, for example a vehicle 100 and another vehicle 403 are moving on a road 401 or roadway 401. The vehicle 100 corresponds to or is similar to the vehicle from FIG. 1 and correspondingly has the vehicle movement control system from FIG. 1 or FIG. 3 or a similar system. The road 401 is, for example, a freeway with two lanes and a breakdown lane. The other vehicle 403 is in front of the vehicle 100 in the direction of travel in the same lane as the vehicle 100.

Customary driver assistance functions can require continuous monitoring by the driver, who is to take over immediately in the event of a malfunction or in a fault situation. If a fault occurs in a driver assistance system, the object of the driver assistance system conventionally consists in detecting the same fault reliably and then switching off safely ("fail silent"). Driver assistance systems for highly automated driving (e.g. Highway Pilot) are intended to permit a situation in which the driver no longer needs to monitor the behavior of the driver assistance system continuously but rather can also dedicate himself to other activities. After the occurrence of a fault, the driver assistance system should be able to bridge a certain time safely until the driver takes over again, i.e. the vehicle 100 is to be capable of being automatically steered and braked ("fail operational"). An implementation of the "fail operational" safety concept for the brakes and steering system is assumed here by the control device of the vehicle movement control system of the vehicle 100.

It is decided by the vehicle movement control system whether, for example, the vehicle 100 remains in the lane, changes into an adjacent lane or is to carry out an emergency maneuver or minimal risk maneuver. For example, a first driving maneuver 701 in FIG. 7 denotes stopping of the vehicle 100 in its own lane in an orderly manner, with the result that traffic behind can react. A second driving maneuver 702 represents stopping on the breakdown lane of the road 401. A third driving maneuver 703 represents an avoidance maneuver into the adjacent lane and braking with monitoring of the traffic behind. A risk increases here from the first driving maneuver 701 through the second driving maneuver 702 up to the third driving maneuver 703.

In this context, the control device of the vehicle movement control system of the vehicle 100 is configured to carry out checking of the vehicle movement control system and/or of a brake system of the vehicle 100 for a fault. In addition, the control device is configured to determine, as a function of a result of the checking, guide data which can be used to control the movement of the vehicle 100, in order to bring about stopping of the vehicle 100 taking into consideration the surroundings of a vehicle.

Figure 8:
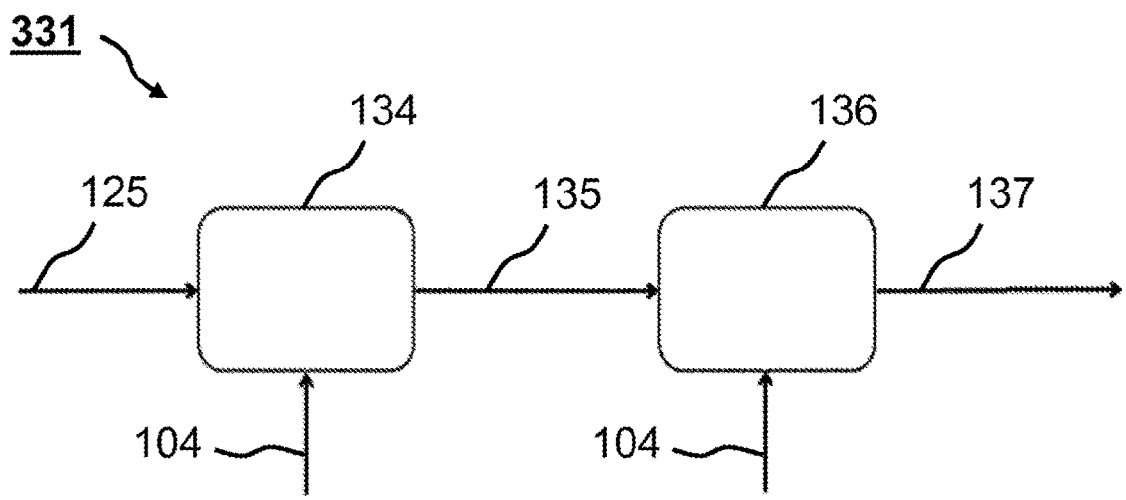
FIG. 8 shows a schematic illustration of the first component-device of the control device from FIG. 3.

FIG. 8 shows a schematic illustration of the first component-device 331 of the control device from FIG. 3. The first component-device 331 here corresponds to or is similar to a component-section of the control device, as is shown in FIG. 1. According to the exemplary embodiment illustrated in FIG. 8, the first component-device 331 of the control device has the determining apparatus 134 and the acquiring apparatus 136.

Input data for the determining apparatus 134 are the specification data 125 and vehicle properties 104. The specification data 125 represent, in particular, a driving corridor with a left-hand and a right-hand boundary $y_{l,dem}(x, t_k)$ and $y_{r,dem}(x, t_k)$, wherein the vehicle properties 104 represent a vehicle geometry and/or kinematics. The determining apparatus 134 is configured to calculate a reference trajectory, wherein a path which is passed over by the vehicle is taken into account. Output data of the determining apparatus 134 are the guide data 135 which represent, for example, the reference trajectory which is described by $y_{F,dem}(x, t_k)$.

Input data for the acquiring apparatus 136 are the guide data 135 of the determining apparatus 134 and vehicle properties 104. The vehicle properties 104 represent dynamic vehicle parameters. The acquiring apparatus 136 is configured to take into account inverse vehicle dynamics. Output data of the acquiring apparatus 136 are the at least one manipulated variable 137 which represents, for example, a steering parameter command (sequence) $\delta_{H,dem}(t_{k,l})$.

In other words, the first component-device 331 takes into account, for the purpose of generating the setpoint trajectory from the predefined driving corridor, for example information about vehicle dimensions (vehicle width), a possible tractrix of a towing vehicle and a semitrailer or trailer, a position of a saddle point (kingpin), the dimensions of the semitrailer, axle configurations, an estimated effective wheelbase from the ESP, a maximum transverse acceleration (position of the center of gravity, tilting limit) which is acquired from the ESP, etc. as vehicle properties 104. A setpoint steering parameter is calculated below taking into account, for example, the steering properties of the vehicle for driving along the trajectory. The steering properties can be derived, for example, from an adapted reference model, present in the ESP.

The second component-device of the control device adds steering functions and the "fail operational" functionality to an electronic brake controller: specifically adds a vehicle dynamic control system (ABS, traction control system and ESP) including steering intervention, coordination of a steering intervention by steering actuators or brakes by steering (steer-by-brake), a system for managing actuators or actuator elements, in particular steering actuators, implementation of the "fail operational" concept, inter alia for steer-by-brake, vehicle state estimation based on sensors of the brake system, calculation of vehicle-specific values and limiting values for the behavior planner, for example a maximum possible deceleration, a latest starting point of an avoidance maneuver, etc., a longitudinal acceleration management system which adds drive train control including the engine and transmission to a deceleration management system etc.

The following tasks of the control device 130 can be specified by way of example with reference to the figures mentioned above. The control device 130 is configured to generate manipulated variables for the drive train, brake system, steering system from a setpoint trajectory and a speed profile, to acquire a vehicle movement status, to stabilize the vehicle, for example by an anti-block system, traction control system and electronic stability package (ABS, traction control system ESP) and/or implement a brake control.

If an exemplary embodiment comprises an "and/or" conjunction between a first feature and a second feature, this is to be understood as meaning that the exemplary embodiment according to one embodiment has both the first feature and the second feature, and according to a further embodiment it has either only the first feature or only the second feature.

THE LIST OF REFERENCE NUMBERS IS AS FOLLOWS

100 Vehicle
102 Providing apparatus
104 Vehicle property
106 First actuator element
108 Second actuator element
110 Vehicle movement control system
120 Generating apparatus
125 Specification data
130 Control device or device for controlling the movement of the vehicle
132 Reading in apparatus
134 Determining apparatus
135 Guide data
136 Acquiring apparatus
137 Manipulated variable
138 Outputting apparatus
200 Control method
210 Reading in step
220 Determining step
230 Acquiring step
240 Outputting step
321 First control apparatus
322 Second control apparatus
323 Third control apparatus
324 Arbitration apparatus
331 First component-device
333 Second component-device
339 Movement status data
340 Fusion and localization apparatus
341 Sensors
342 Communication apparatus
343 Apparatus for road maps
344 Apparatus for vehicle position coordinates
345 Carrying out apparatus
346 World model
350 Behavior planning apparatus
352 Decision apparatus
400 Traffic situation
401 Road
403 Other vehicle
405 Available driving space
407 Driving corridor
409 Trajectory or path
500 Traffic situation
600 Traffic situation
700 Traffic situation
701 First driving maneuver
702 Second driving maneuver
703 Third driving maneuver

The invention claimed is:

1. A method for controlling a movement of a vehicle, the method comprising:
reading-in specification data from an interface with at least one generating apparatus, wherein the vehicle has a vehicle movement control system having the at least one generating apparatus for generating specification data for the movement of the vehicle, at least one providing apparatus for providing at least one vehicle property of the vehicle and at least one actuator element for influencing the movement of the vehicle, and wherein the specification data represent a driving corridor and/or a speed profile for the vehicle for a route section, and the at least one vehicle property from an interface with the at least one providing apparatus;
determining guide data for the vehicle using the specification data and the at least one vehicle property, wherein the guide data is usable to control the movement of the vehicle while complying with the specification data;
acquiring at least one manipulated variable for the at least one actuator element using the guide data; and
outputting the at least one manipulated variable to an interface with the at least one actuator element.

2. The method of claim 1, wherein in the determining, a setpoint trajectory and/or a setpoint speed profile is determined for the vehicle as guide data using the specification data and the at least one vehicle property.

3. The method of claim 1, wherein in the acquiring, a steering parameter for a steering actuator and/or an acceleration value for a drive system and/or a brake system of the vehicle is acquired as the at least one manipulated variable.

4. The method of claim 1, wherein in the reading-in, further specification data are read in from an interface with at least one driver assistance apparatus, one driving data sensor and/or one surroundings sensor of the vehicle, and wherein in the determining the guide data are determined using the further specification data.

5. The method of claim 1, further comprising:
checking of the vehicle movement control system and/or of a brake system of the vehicle for a fault;
wherein in the determining guide data are determined as a function of a result of the checking carried out in the checking, which guide data can be used to control the movement of the vehicle to bring about stopping of the vehicle taking into consideration the surroundings of a vehicle.

6. The method of claim 1, further comprising:
detecting movement status data of the vehicle using a sensor signal of at least one vehicle sensor, wherein the movement status data represent vehicle-specific values and limiting values during the movement; and
transmitting the detected movement status data to an interface with at least one apparatus of the vehicle movement control system.

7. The method of claim 1, wherein in the reading-in, at least one steering parameter specification is read in as the specification data from an interface with at least one driver assistance apparatus of the vehicle, wherein in the determining the guide data are determined using the at least one steering parameter specification, and wherein in the acquiring a combined steering parameter is acquired as the at least one manipulated variable using the guide data.

8. The method of claim 1, wherein in the reading-in, at least one static property of the vehicle and/or at least one dynamic property of the vehicle are/is read in as the at least one vehicle property, wherein the at least one vehicle property represents a sensor information item of at least one vehicle sensor, a dimension of the vehicle, a tractrix of the vehicle in the case of a multi-part embodiment with a towing vehicle and a semitrailer or trailer, a position of a saddle point between the towing vehicle and the semitrailer or trailer, a dimension of a trailer or semitrailer of the vehicle, an axle configuration, a wheelbase, a permissible transverse acceleration, a position of the center of gravity, a tilting limit and/or a steering property.

9. A device for controlling a movement of a vehicle, comprising:
a controlling device configured to perform the following:
reading-in specification data from an interface with at least one generating apparatus, wherein the vehicle has a vehicle movement control system having the at least one generating apparatus for generating specification data for the movement of the vehicle, at least one providing apparatus for providing at least one vehicle property of the vehicle and at least one actuator element for influencing the movement of the vehicle, and wherein the specification data represent a driving corridor and/or a speed profile for the vehicle for a route section, and the at least one vehicle property from an interface with the at least one providing apparatus;
determining guide data for the vehicle using the specification data and the at least one vehicle property, wherein the guide data is usable to control the movement of the vehicle while complying with the specification data;
acquiring at least one manipulated variable for the at least one actuator element using the guide data; and
outputting the at least one manipulated variable to an interface with the at least one actuator element.

10. A vehicle movement control system for a vehicle, comprising:
a generating apparatus for generating specification data for movement of the vehicle, wherein the vehicle has at least one providing apparatus for providing at least one vehicle property of the vehicle and at least one actuator element for influencing the movement of the vehicle; and
a device connected at least to the generating apparatus so that it is capable of transmitting signal;
wherein the device is configured to perform the following:
reading-in the specification data from an interface with the generating apparatus, wherein the vehicle has a vehicle movement control system having at least one generating apparatus for generating specification data for the movement of the vehicle, at least one providing apparatus for providing at least one vehicle property of the vehicle and at least one actuator element for influencing the movement of the vehicle, and wherein the specification data represent a driving corridor and/or a speed profile for the vehicle for a route section, and the at least one vehicle property from an interface with the at least one providing apparatus;
determining guide data for the vehicle using the specification data and the at least one vehicle property, wherein the guide data is configured to control the movement of the vehicle while complying with the specification data;
acquiring at least one manipulated variable for the at least one actuator element using the guide data; and
outputting the at least one manipulated variable to an interface with the at least one actuator element.

* * * * *